Jan. 12, 1960 N. J. HALIP 2,920,768
DISPLAY BOARD AND PARTS THEREOF
Filed March 29, 1955 3 Sheets-Sheet 1

INVENTOR.
NICKOLAS J. HALIP
BY
Sidney A. Ochs
ATTORNEY

Jan. 12, 1960 N. J. HALIP 2,920,768
DISPLAY BOARD AND PARTS THEREOF
Filed March 29, 1955 3 Sheets-Sheet 2

INVENTOR.
NICKOLAS J. HALIP
BY
Sidney A. Ochs
ATTORNEY

Jan. 12, 1960   N. J. HALIP   2,920,768
DISPLAY BOARD AND PARTS THEREOF
Filed March 29, 1955   3 Sheets-Sheet 3

INVENTOR.
NICKOLAS J. HALIP
BY
Sidney A. Ochs
ATTORNEY

United States Patent Office 2,920,768
Patented Jan. 12, 1960

2,920,768

DISPLAY BOARD AND PARTS THEREOF

Nickolas J. Halip, Windsor, Ontario, Canada

Application March 29, 1955, Serial No. 497,752

25 Claims. (Cl. 211—183)

This invention relates to improvements in display panels for exhibiting merchandise or advertising and the like, and particularly concerns improvements in framing for such panels and in edge corner constructions comprising the latter.

The subject application is a continuation-in-part of my copending application Serial No. 429,092 filed May 11, 1954.

In my prior application aforesaid, I have shown various ways for securing a plurality of panels into a display assembly and have also disclosed a number of unique corner and edge constructions for framing apertured panels of fibrous or other materials and of any shape. The constructions are unique in that the parts may be made of interchangeable character; need not be fitted to a panel at the point of manufacture, and may be shipped in kits for use with panels obtained locally.

It is contemplated that the improvements hereinafter described may in part replace or in part provide additions to those of my prior application and may be used in any combination there illustrated or contemplated and with any form or shape of board material. The constructions of said prior application are therefore adopted herein and made a part hereof insofar as they may be utilized with the subject invention.

In display constructions of the type shown in my prior application aforesaid, a rapid assembly of the framing members is advantageous. This may be facilitated where a minimum of different parts can be handled and where the handling and assembly of loose screw fastening means is minimized or where the parts may be assembled into an integral structure and the screw fasteners where used, located in position during a single period of the assembly operation instead of as at spaced intervals interrupting the assembly operations. Moreover, the elimination of projecting screw-type fastening means is advantageous where a more prim-like framing of a display board is desired. The present invention makes constructions having these features possible.

Accordingly, the present invention provides as one object, an interconnector or coupling for adjacent ends of axially aligned side trim rails of a display panel assembly or the like, which effects a telescoping interlock between said rails, which requires no clamping or fastening means for facilitating the assembly and which may be produced from sheet metal.

Another object is to provide a bipartite connector for effecting a lap joint with the ends of adjacent, aligned or angularly related side rail sections of a display panel assembly or the like and which comprises opposite mating, half pieces of substantially identical shape and form readily assembled to the panel rails and clamped thereto by suitable fastening means to provide a trim appearing and shift inhibiting connection between such rail sections.

A further object is to provide a bipartite connector, clamp or elbow (straight or angular) for effecting a lap joint with the ends of adjacent side rail sections of a display panel assembly or the like comprising opposite mating half pieces provided with interengageable edge portions and a snap interlock at such edge portions.

It is also an object of my invention to provide a device or structure of the type set forth in the preceding object which is provided with additional fastening means, for instance a bolt and wing nut, for further interlocking the halves to the panel.

A specific object is to provide a lapping type bipartite connection, clamp or elbow for adjacent edge trim or side rail sections of a display panel or the like comprising opposite half pieces engageable and secured together by a snap fastener or button-like type interlock, the parts of which are permanently secured to the half pieces.

Another specific object is to provide a lapping type bipartite construction as in the preceding object wherein a screw and socket-type fastener means, accommodating various thicknesses of board material is provided and wherein the parts may be permanently held to the half pieces.

Still another object is to provide a connection clamp or the like as in the two preceding objects wherein the fastening means serves to interlock the half pieces with the panel.

It is also an object to provide a spring-type interlocking means between the panel and edge trim or side rails of a display panel assembly wherein the apertures of the panel serve as locating and anchoring bases for the interlocking means when effecting the interlock.

Other objects and advantages of my invention will be apparent from the following description of preferred forms of the novel display assembly and parts of my invention as illustrated in the drawings wherein.

Figures 1, 2, 3, 4, 5, 6, 7, 8, 9, 10:
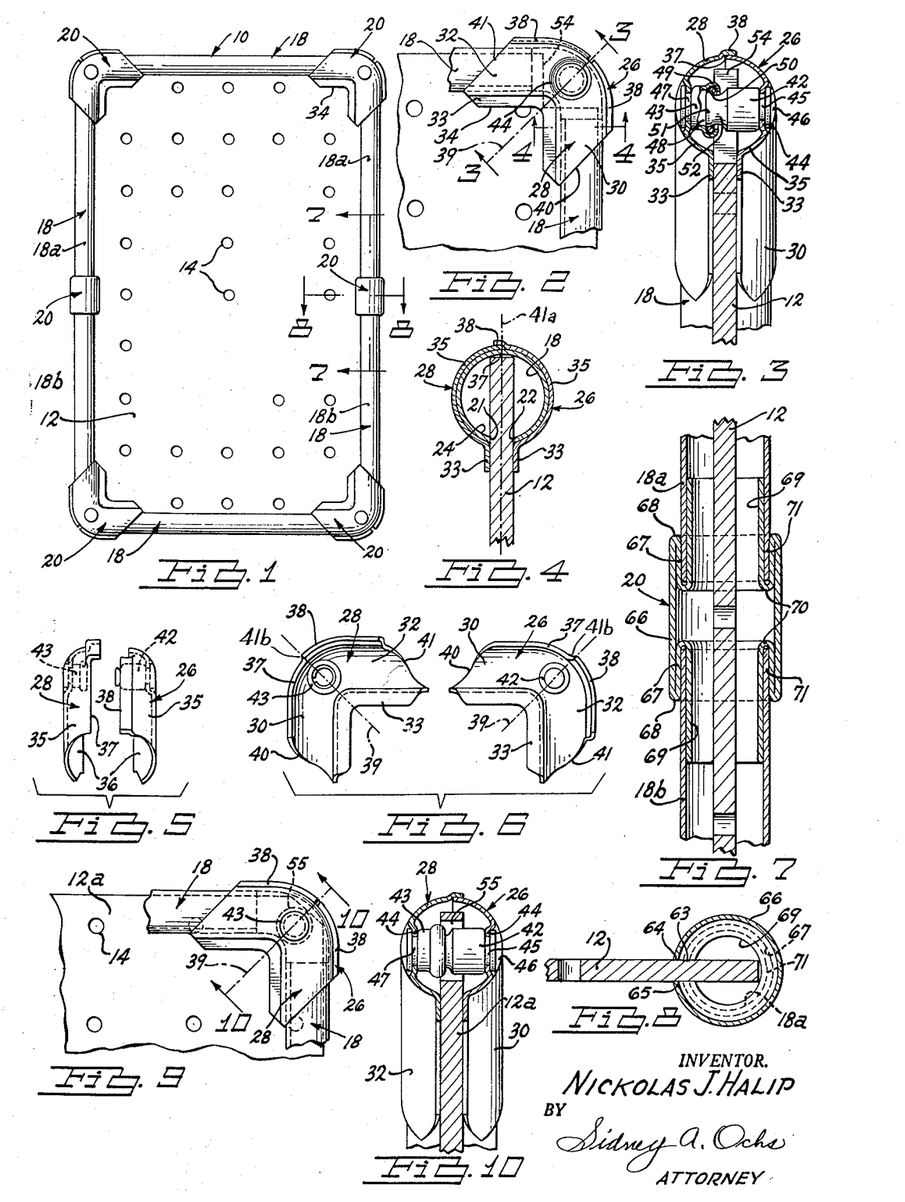
Figure 1 is a front elevational view of a display panel assembly or the like embodying certain features of my invention.
Figure 2 is a sub-assembly view showing one form of corner construction of the panel of Figure 1.
Figure 3 is a cross sectional view of the corner construction of Figure 2 taken at 3—3 of Figure 2 and showing the manner of holding the corner halves together by a snap type interlock employing a pin and socket construction.
Figure 4 is a cross sectional view of the corner construction of Figure 2 taken at 4—4 of Figure 2.
Figure 5 is an exploded view in side elevation of the half pieces of the corner clamp construction of Figure 2 looking externally thereof in their relative positions ready to be assembled together.
Figure 6 is an exploded plan view of the male and female half pieces of the corner clamp of Figure 2 looking at the interior faces thereof, these halves being similar in construction except for the fastening portions integrally carried thereby.
Figure 7 is a sub-assembly cross sectional view of the telescopic coupling means of Figure 1 for securing together adjacent aligned ends of panel side rails, this view being taken at 7—7 of Figure 1.
Figure 8 is a cross sectional view through the coupling sub-assembly taken at 8—8 of Figure 1.
Figure 9 is a sub-assembly view of a corner construction such as illustrated in Figures 2 and 3 modified to have the snap fastener means interlock with a board aperture.
Figure 10 is a cross sectional view taken at 10—10 of Figure 9 showing the manner of effecting the interlock of the fastening means with the board.

Referring now to the various figures of the drawing wherein similar numerals designate similar parts of the structure, Figure 1 discloses a typical display panel assembly generally referred to by the numeral 10. The panel assembly preferably comprises a panel board 12 preferably provided, as shown, with a plurality of regularly spaced, through apertures 14, preferably arranged in identical rows with each aperture aligned with that of the rows immediately above and below it but which apertures may, if desired, be offset relative thereto. By preference, the panel board 12 is of rigid fibre board material which is commercially available as a pressed board with pre-formed apertures and which may be conveniently cut to any desired shape and size. Other materials such as metal in flat sheets or corrugated sheets having the perforations in the peaks and valleys may, however, be used.

Figure 10A:
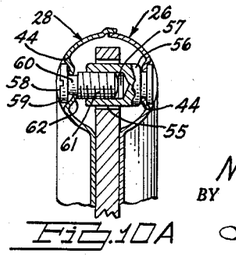
Figure 10A is a modification of the fastening construction of Figures 3 and 10 showing the use of permanently mountable screw and socket fastening means.

Tubular side rails 18 (see Figure 4) are disposed about the periphery of the board 12, as shown, and the adjacent ends of the rails may be joined at all four corners by the corner constructions 20 which may be of any of the forms illustrated in Figures 3, 10, 10A, 12, 23 and related figures, preferably those of Figures 3 and 10A, these corner sub-assemblies being constructed to blend with the tubular configuration of the side rails 18 and form a continuous and integral frame assembly. If desired, the elongated side rails 18 may comprise, as seen in Figure 1, a pair or more of shorter rail segments 18a and 18b connected by a coupling 20, one preferred construction of which is shown in detail in Figures 7 and 8 and which will hereinafter be further described.

The structural side rails 18 may preferably comprise substantially tubular-shaped members of any cross sectional shape, for instance circular, and preferably are made of a light-weight metal such as aluminum or aluminum alloy. As evident from Figure 4, for instance, these members have axially extending open seams or side openings 21 defined by adjacent longitudinal edges 22, 24 of the tubular wall between which an outer or peripheral edge portion of the panel board 12 may be inserted preferably in abutting relation with the inner side of the tube opposite the opening. If desired, the edges 22, 24 may be flanged as hereinafter described in connection with Figure 11.

Figure 11:
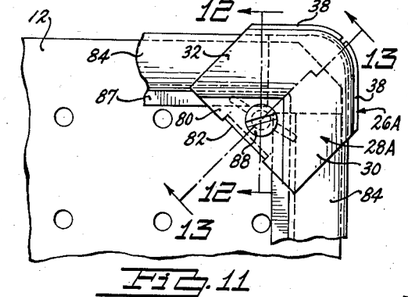
Figure 11 is a sub-assembly view showing a modified form of corner construction for use with the panel assembly of Figure 1 and employing identical corner half pieces which may be secured to the board by fastening means such as a bolt and wing nut.

For maintaining these side rails in proper relation to the panel board edges and to each other, for instance when disposed along two intersecting edges of the board, I provide a unique bipartite corner construction 20, for instance that shown in detail in Figures 2 to 6 inclusive, and comprising two pre-formed, mating, oppositely disposed dished halves or elements 26, 28 of sheet metal material, for instance aluminum, adapted to fit over and lap the ends of the adjacent side rails 18 and preferably firmly abutting the opposite faces of the board 12 directly or through intervening side flanges of the rails (see Figure 11).

As evident from Figures 5 and 6, these pre-formed mating elements 26 and 28 may be identical in form and shape, each by itself and with its mating element defining a generally L or V angular configuration simulating an angle elbow and each having its divergent leg portions 30, 32 preferably meeting in a curved intersection.

Each element configuration or half piece preferably has a relatively narrow base or marginal flange 33 of substantially uniform width preferably adapted to directly abut the face of the board 12 in assembly and which extends contiguous with the leg portions 30, 32 at the inner side or edge 34 of the configurations. Rising from this base flange 33 is an upstanding or elevated wall 35 of concave-convex section preferably conforming to the rail section, for instance semi-circular, which extends contiguously with the flange 33 of the configuration to provide a continuous channel 36 (Figure 5) adapted to encompass and nest or fit and lap the end portions of the adjacent corner forming rails 18 (see Figure 2) at the side of the board abutted by the flange 33.

The wall 35, as best seen in Figure 4, extends upwardly from its intersection with the flange 33 and half way around the section of the rails 18 with which it nests, terminating in the case of the legs 30 of the half pieces 26, 28 in a free edge 37 and in the case of the legs 32 thereof in an offset relatively narrow flange 38, this edge 37 and flange 38 defining the outer side edge or periphery of the element configuration and each commencing from a point on the bisector 39 of the angle between the legs 30, 32 and extending in opposite directions to the end edges 40, 41 of their respective legs.

It will be noted that the free edge 37 of leg 30 of one element (28 in Figure 4) preferably lies in a median plane 41a through the board thickness and that the flange 38 portion of the wall 35 of leg 32 of mating element 26 is outwardly offset from the wall 35 and extends past this median plane so as to lap the free edge 37 of the wall of leg 30 of the mating element. Hence when the elements 26, 28 are in assembled position, the flange 38 of one laps the free edge 37 of the other to produce a substantially continuous lap seam at the outer side of the elbow and the flanges 33 of each abut an opposite face of the board. Moreover, as evident from Figures 1 to 6, for example the shoulders 41b (see Figure 6) formed between the free edge 37 and flange 38 of the elements guide the assembly, these shoulder portions becoming interengageable incident to engagement of the elements, the free edge portion 37 of element 28 underlying the flanged portion 38 of mating element 26 and free edge portion 37 of element 26 underlying flange portion 38 of mating element 28.

By preference the legs 30, 32 are made of equal length and their end edges 40, 41 respectively are parallel to each other and to the bisector 39 such that when the opposite elements are assembled, the edge 40 of the leg 30 of one will substantially coincide with the edge 41 of the transversely opposed leg 32 of the other.

A particular feature of the structure in Figures 2 to 6 is the fastening means for holding the opposite half elbows, pieces or elements 26, 28 together in assembled relation to the board 12 and tubular edging 18. Such means as seen best in Figures 3 and 5, is a snap type fastener or interlocking means preferably located on the bisector 39 at the peak of the channel 36 and arranged normal to the board. It comprises a male stud 42 and a female socket 43. As seen, the stud 42 is secured as by riveting to the inner side of an apertured wall or seat 44 formed by inwardly flattening a circular region of the wall 35 of the element 26. The stud 42 has a reduced end 45 which projects through the seat 44 and is headed over as at 46 preferably without projecting beyond the surface of wall 35. The socket 43 is similarly secured as by riveting an end portion 47 to the seat 44 in the wall 35 of element 28 and in coaxial alignment with the stud 42 as to engageably receive the latter. As seen, the socket 43 has a recess 48 provided with an outwardly pressed annular groove 49 in which is received and laterally confined a snap ring 50 which is adapted to resiliently open to pass the head portion 51 of the stud 42 and resiliently grasp the reduced neck portion 52 of the head in detent fashion to hold the two elements 26, 28 securely in place.

By preference, the head portion of the stud 42 on the element 26 will project beyond the plane of the free edge 37 of the element 26 to guide the assembly, and both it and the socket 43 will, as seen in Figure 3, have sufficient length to come within the board thickness when the flanges 33 are in abutting relation with the opposite faces of the board 12.

In the structure of Figure 2 the panel board 12 is V-notched or edge slotted or recessed as at 54 and the sides of the notch may be in proximity to the stud and socket elements 42 and 43 to guide the corner assembly. The notch 54 may be of other shapes than a V, for instance U-shaped, so as to provide side faces to inhibit displacement of the corner and rails from the board. However I preferably use the arrangement in Figures 9 and 10 where the same elements 26, 28 are used as in Figure 2, but the board 12 is punched with a circular corner opening 55 spaced inwardly from the side edges of the board and into which the stud and socket elements 42, 43 of the fastening means respectively are received to locate the opposite elements 26, 28 in assembly. In this arrangement the board not only aids in guiding the elements 26, 28 together but it prevents displacement in any direction of the rails 18 and corner elements 26, 28 after assembly and in use.

In Figure 10A I have shown a further unique modification of the novel corner or rail holding construction of Figures 3 and 10 using the parts shown in these figures but in which a screw type fastening device is employed in place of the snap-type fastener of Figure 3.

In this construction the element 26 has preferably riveted to the seat 44 thereof in the manner described with respect to the stud 42, a post or stud 56 provided at its inner end with a threaded bore 57 into which may be threadably received a screw 58. As seen, the post is of sufficient length to extend through a corner aperture 55 of the board, the latter guiding the post 56 into position and prevent shifting of the assembly.

The screw 58 preferably has a shallow slotted head 59 and a neck portion 60 of a diameter less than the base of the thread located between the head 59 and threaded shank 61. The seat 44 on the element 28 has its apertured portion 62 threaded either by a tap, or by suitably shaping the wall of the seat 44 in stamping to provide a single thread. Once the screw 58 is threaded into the aperture portion 62 past the uppermost end of its threaded shank 61, the neck 60 enters the same and thereafter unless the thread or the portion 62 be carefully caught again by the uppermost thread on the shank 61 the screw cannot be backed out. Hence the arrangement is one where the parts of this fastening device, once assembled cannot be lost but the screw may be replaced if damaged. This modified structure has the special advantage of being usable with boards of different thicknesses since the threaded construction provides an adjustable take-up for meeting all conditions of use of these corner elements.

The fastening features of Figures 3, 10, and 10A produce a corner construction that is clean cut in appearance and devoid of distracting projections at the surface or inner corner. It also avoids the need for handling separate loose bolts or other holding devices.

It will be understood that although the elements 26, 28 are shown as corner-forming elbow members, they may be made straight, i.e., of a straight configuration instead of angular elbow configuration for the purpose of coupling odd lengths of side rails and any of the aforesaid types of fastening means and board interlock may be used therewith.

In Figures 7 and 8, I have illustrated in greater detail the novel telescopic coupling 20 of Figure 1 which I may use for rigidly coupling adjacent rail sections 18a, 18b. As seen, the coupling is of tubular character and is provided with an open seam or side opening 63 extending the length thereof defined by the adjacent longitudinal edge portions 64, 65 of the coupling and between which the edge portion of the panel 12 may be recessed or inserted.

The coupling 20 comprises an outer tubular layer 66 centrally of the coupling; an intermediate concentric layer 67 at each end of the outer layer 66 extending inwardly thereof toward each but preferably short of meeting, these intermediate layers 67 connecting with the outer layer 66 by a bend 68 and lapping the outer layer internally thereof; and a pair of coaxially inner concentric layers 69, one each connecting with a layer 67 by a bend 70 at the inner ends of these intermediate layers and radially spaced from the intermediate layers 67 to form axially extending spaced apart annular spaces 71, the layers 69 extending outwardly beyond the opposite outer ends of the intermediate and outer layers.

Into the annular spaces 70 formed by the inner and intermediate layers 69 and 67 are telescopically receivable the walls of rails 18a, 18b, the spacing of these layers being such to assure a good fit with the rails.

By preference this coupling 20 will be formed from a flat sheet whose opposite ends are folded back against itself to form a closed lap as characterized by the layers 66, 67 and then folded forwardly again to form open laps as characterized by the layers 67, 69 the folding being like a letter S or the reverse thereof. The inner ends of the second folds at the bends 70 may abut each other if desired or be spaced but if the latter will preferably be spaced apart a distance leaving sufficient depth for the annular space 71 for receiving the side rails. After the double folding aforesaid is put into effect, the folded member with pliable inserts in the grooves 71 is bent or shaped into a tubular member with open seam as described above.

In Figures 11 to 15 inclusive, I have illustrated details of a further corner construction which also may comprise two identical opposed halves 26A, 28A. These are of similar construction to the corner elements 26, 28 of Figures 2 to 6 but omit the snap fastener feature of the latter corners and are provided with inner corner webbings 80 intermediate the legs 30, 32 and apertured as at 81. Moreover, each web 80 is provided with an inwardly directed, for instance, right angular lip 82.

Figure 12:
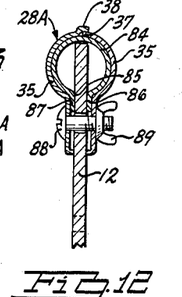
Figure 12 is a cross sectional view taken at 12—12 of Figure 11.
Figure 13:
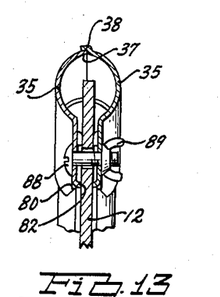
Figure 13 is a cross sectional view taken at 13—13 of Figure 11.
Figure 14:
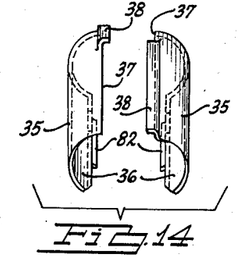
Figure 14 is an exploded elevational view of the identical halves of the corner sub-assembly of Figure 11 shown in their relative positions ready for assembly.
Figure 15:
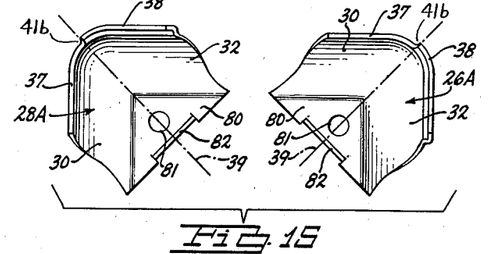
Figure 15 is a plan view showing the interior faces of the identical halves of Figure 14, the parts being opened to a flat position.

The corner halves 26A, 28A are illustrated assembled to a board having cylindrical tubular edge trim rails 84, the latter being provided adjacent the open seam 85 thereof with narrow edge flanges 86, 87 abutting the opposite faces of the board 12.

As seen, the corner halves 26A, 28A also have upstanding portions 35 defining semi-circular shaped channels 36 adapted to encompass opposite sides of the rails 84. Moreover, each half is formed with an outer peripheral edge lip 38 extending from one end to the corner 42 on the bisector 39 which is adapted to become interlocked or lapped with the free outer peripheral edge 37 of the opposite half to form a continuous lap seam over the full length of the outer periphery of the assembled corner.

The half pieces 26A, 28A may be securely clamped together to the board and rails by a single bolt 88 which extends through the apertures 81 of the opposite pieces and preferably through an aperture 14 of the board 12 to thereby prevent shift of the corner when the corner elements are once assembled. A wing nut 89 may be used with the bolts 88 to provide for quick assembly and disassembly.

It will be noted that the corner webbing 80 laps the rail flanges 86, 87 and is thus raised slightly off the face of the board 12. The lip 82 stiffens and prevents distortion of the webbing 80 by stepping off the webbing 80 to the proper plane. It will be understood that the lip 82 will be preferably omitted when the rails have no edge flanges such as in the case of the rails 18. Alternatively the web may be formed with an offset face adjacent the flanges 86, 87.

Figures 16, 17, 18, 19, 20, 21:
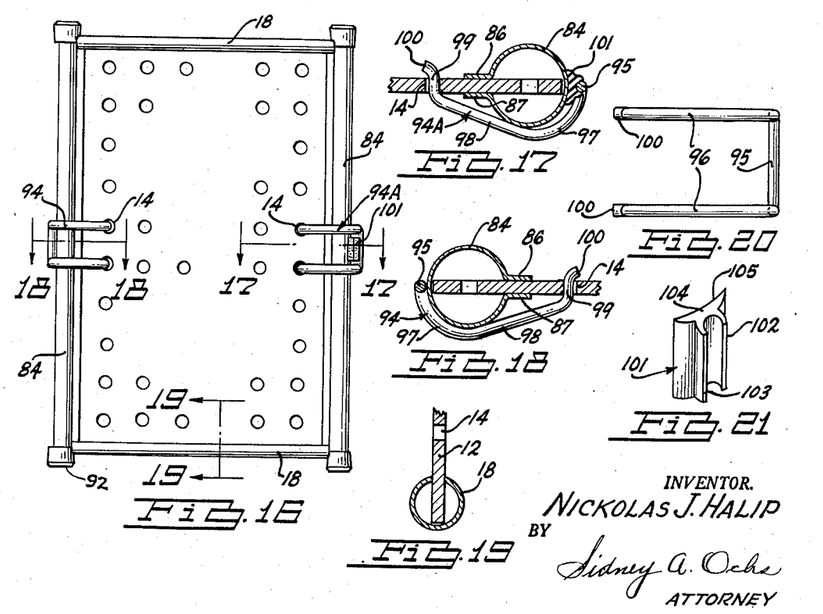
Figure 16 is a front elevational view of a modified form of display panel assembly illustrating a spring clip form of fastening means for holding the side rails to the board.
Figure 17 is a sub-assembly view taken at 17—17 of Figure 16 showing the manner of retaining the panel framing in position by means of the spring clip fastening means.
Figure 18 is a sub-assembly view similar to that of Figure 17 omitting the shoe element of Figure 17 and taken at 18—18 of Figure 16.
Figure 19 is a cross sectional view of the lower edging of Figure 16 taken at 19—19 of Figure 16.
Figure 20 is a side view of the spring means of Figures 17 and 18.
Figure 21 is a perspective view of the spring clip shoe of Figures 16 and 17.

Figure 16 illustrates a display board combining the rail structures of Figures 1 and 11 and in which a snap type fastener of wire form is employed for maintaining the rails in place. As shown, the upper and lower rails 18 grip the edge portion of the board 12 and abut the end of the flanges 86, 87 of the rails 84. Suitable resilient caps or boots 92 are received over and grip the ends of rails 84 to hold the rails 18 in place.

The rails in Figure 16 may be held from lateral displacement by spring-type U-shaped clips 94, 94A of rod or wire which anchor in apertures 14 of the board 12 and partially encompass and grip the cylindrical surface of the rails 84.

As seen, the clip 94 in Figures 16 and 18 comprises a base or cross bar 95 and opposite legs 96 preferably of circular section, the legs being curved for a portion 97 of their length adjacent the bar 95 to substantially fit the curvature of the rail 84 over approximately a 120° segment and having straight portions 98, offset by the curved section 97 from the bar 95, and which terminate at their outer ends in further offset portions or fingers 99 of a reverse curve or S shape extending divergently from the straight portions 98 at an obtuse angle thereto and lying on the same side of the straight portions 98 as the cross bar 95.

It will be noted from Figures 17 and 18 that the axis of the cross bar 95 and the approximate mid point of the S section 99 fall substantially on a line bisecting the board thickness. Moreover, it will be seen that the fingers 99 extend through the apertures 14 from one side of the board and have their outer extremities 100 which turn toward the opposite side of the board hook or engage the edge of the aperture of the board at that side to provide a fulcrum about which the clip may swing when its base end 95 snaps over the rail 84, and to prevent displacement of the clip when engaged with the rail.

The clip 94A in Figure 17 is identical to that of Figure 18 except that a foot or shoe 101 of resilient, rubber-like material is provided on the base bar 95 to engage the surface of the rail 84 and thus prevent marring of the rail surface in assembly while at the same time providing an excellent grip of that surface.

The shoe 101 as seen in Figure 21 comprises a pair of concave fingers 102, 103 which are integrally formed with a base 104 having a concave rail engaging face 105. The concave fingers 102, 103 are adapted to resiliently engage the curved outer surface of the cross bar 95 of the clips as shown and thus permit the foot to be snapped in place thereon.

In Figures 22 to 26 I have shown a corner construction somewhat similar to that in Figures 7 and 8 of my copending application Serial No. 429,092 aforesaid but differing in that the corner halves here are interhooking and self-interlocking by appropriate assembly and snap action.

Thus the construction here comprises two substantially identical opposed corner halves 110, 112 each having a pair of V-arranged legs 114, 115 comprising upstanding portions 116 of concave-convex section defining in the form illustrated semi-circular shaped channels 117 which intersect at the base of the V to form a continuous channel 117. The channels 117 and portions of legs 114, 115 respectively are adapted to encompass and nest with the opposite sides of the adjacent corner making rails 118, which in the form shown are of the type provided with inner edge flanges 120 abutting the opposite faces of the board 12.

Figure 22:
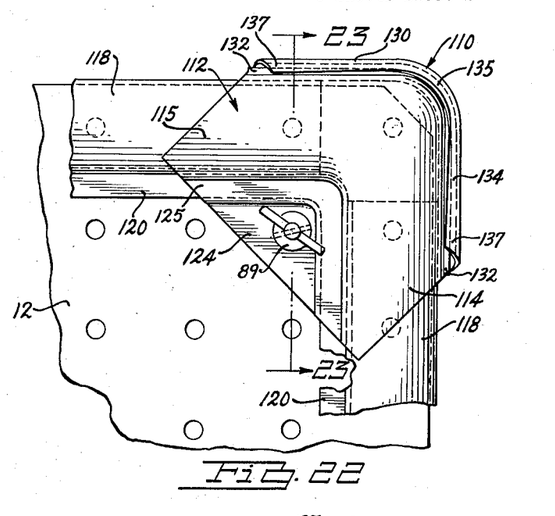
Figure 22 is a sub-assembly view in plan showing another form of corner construction for use with the panel assembly of Figure 1 and having an edge form of interlock between the half pieces of the type shown in my prior copending application aforesaid but adapted to be sprung into locking interengagement whereby the halves are self-securing to the board and for which the screw fastening means shown is a supplementary fastening means.
Figure 23:
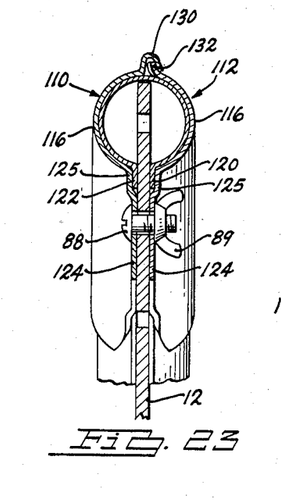
Figure 23 is a cross sectional view taken at 23—23 of Figure 22 and showing the form of edge interlock and screw fastener supplement.
Figures 24, 25:
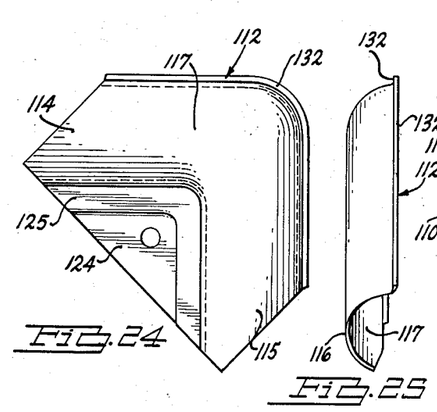
Figure 24 is an internal facial plan view of the male half of the corner construction of Figure 22.
Figure 25 is a side elevational view of the member in Figure 24.
Figure 26:
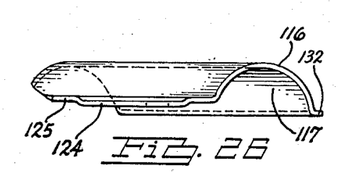
Figure 26 is a bottom side elevational view of the member of Figure 24.

Connecting the legs 114, 115 of each half at the inner side of the V is a webbing 124 from which the upstanding portion 116 rises and which abuts a face of the perforated board 12. Adjacent the upstanding portion 116 the webbing is provided along its entire length with a border-like offset face 125 which is adapted to lap the marginal edge flanges 120 of the rails 118.

Figures 27, 28:
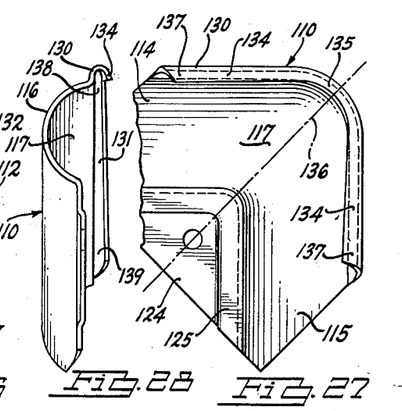
Figure 27 is an internal facial plan view of the female half of the corner construction of Figure 22 showing the peculiar edge lip formation thereof.
Figure 28 is a side elevational view of the female half element of Figure 27 showing the outward flare of the edge lip portion thereof.

The half piece 110 is provided along its entire outer peripheral edge with a lip 130 of hook-like or generally V or V section providing a recess 131 preferably of rounded base adapted to receive and interlock with an outwardly turned lip 132 provided along the entire outer peripheral edge of the half piece 112 by interengaging therewith.

A feature of this interlocking construction is its adaptability to a snap interlock of the two half pieces together in the manner of male and female parts of a snap fastener.

To effect this result the lip 130 is formed as seen especially in Figures 27 and 28 such that the inturned flange portion 134 of the V lip 130 tapers in width (preferably a gradual taper) from a region 135 of minimum width at the bisector 136 of the angle between the legs 114, 115 of this half to a point 137 of greatest width at the outer end of the legs. Moreover, the recess 131 likewise tapers in width (preferably gradually) from a point 138 of minimum width at the region of the bisector 136 to a point 139 of maximum width at the ends of the legs. The width of the base of the recess 131 at the region of the bisector 136 will preferably be slightly greater than the thickness of the lip 132 of the opposite half piece 112. It will be observed that the outer peripheries of the lips 130 and 132 are substantially parallel to each other and to the edges of the rails 118. Moreover, the ends of the legs are cut to extend parallel to the bisector 136.

In assembling the corner, the half piece 112 is first positioned in nesting relation to the rails 118. Next the half piece 110 is brought over the opposite sides of the rails 118 and the inturned flange 134 of one leg 114 of this half piece 110 hooked or interengaged with the lip 132 of corresponding leg 115 of the half piece 110. In this relationship the adjacent opposite legs of these pieces will be found to be spaced apart divergingly away from the juxtaposed rail 118 starting from the point of engagement. Then other leg portions are pressed together over their juxtaposed rail portions and it will be found that such operation will cause the adjacent lip portions 130, 132 of these legs to snap into interengagement so as to lock the two half pieces together. Disassembly of the corner is easily obtained by applying pressure with the finger of one hand against the flange 134 of the lip 130 of the half piece 110 at the end of its leg 115 while simultaneously holding the adjacent opposite legs between the fingers of the other hand and pressing in the opposite direction against the end of the adjacent leg 114 of this piece 110. This in effect produces a twisting action unlocking the corner elements.

From the foregoing description of my invention it will be evident that I have provided a novel display panel assembly and unique corner and edge constructions well adapted for this purpose. It will be understood that the principles and features described above may be applied by those skilled in the art to other specific constructions. For example, when it is desired to simulate a frame on a face of a board, a half rail and single half pieces may be employed to produce this effect, the half pieces being then secured to the board with any of the devices shown herein.

Accordingly, all modifications, changes and equivalent constructions coming within the spirit and intent of my invention are contemplated.

I claim:

1. In a display assembly including a panel having adjacent side rails of generally tubular shape disposed along peripheral portions thereof; coupling means securing together adjacent ends of said rails comprising complementary mating elements having elevated clamping portions for straddling and embracing said adjacent rail ends on opposite facial sides of said panel, said elements having mutually engageable outer peripheral edge portions in lapping relationship to provide a substantially closed edge joint between said elements and having inner portions formed on each element seating against said panel and fastening means extending between said elements and through a recess in said panel securing said elements against said adjacent rails.

2. In a display assembly including a panel having adjacent side rails of generally tubular shape disposed along peripheral portions thereof; coupling means securing together adjacent ends of said rails comprising complementary mating elements having elevated clamping portions generally conforming to the contour of said side rails straddling and embracing said adjacent rail ends on opposite facial sides of said panel, said elements having mutually engageable outer peripheral edge portions in lapping relationship providing a substantially closed edge joint between said elements and having inner lip portions seating against said panel and fastening means securing said elements against said rails and to said panel.

3. A display assembly as claimed in claim 2 wherein said fastening means includes a part interlocked with one of said mating elements at its inner side and another part interlocked with the other of said mating elements at the inner side of the latter and wherein there are means for interlocking said parts together.

4. A display assembly as claimed in claim 2 wherein said fastening means is of the snap interlocking type and comprises interengageable members one rigidly secured to one of said mating elements at the inner side of its elevated portion and the other rigidly secured to the other of said mating elements at the inner side of its elevated portion.

5. For a display assembly including a panel having adjacent side rails of generally tubular shape disposed along peripheral portions thereof; coupling means for securing together adjacent ends of said rails comprising complementary substantially similar mating elements of sheet-like material having elevated clamping portions for straddling and embracing said adjacent rail ends on opposite facial sides of said panel, said elements having mutually engageable outer peripheral edge portions adapted to be brought into lapping relationship to provide a substantially closed edge joint between said elements, the said outer peripheral edge portion of each of said elements comprising an offset edge lip extending along the outer peripheral edge thereof from adjacent one outer end thereof to a point of meeting with a free edge lip extending along said outer peripheral edge from the other outer end thereof, the offset lip of one element being adapted to lap the free edge lip of the other.

6. In a display assembly including a panel having adjacent side rails of generally tubular shape disposed along two intersecting peripheral edges of a corner thereof; coupling means securing together the adjacent ends of said rails comprising complementary substantially similar mating elements of sheet-like material straddling said adjacent rail ends on opposite facial sides of said panel, each of said elements having intersecting leg portions disposed to each other at an angle corresponding to the included angle between said adjacent rails and each leg portion of said elements including an elevated portion nesting with one of said rails, an inner peripheral flange portion positioned in adjacency to a face of said panel and an outer peripheral edge portion, the said outer peripheral edge portion of one leg of each element comprising an offset lip and the outer peripheral edge portion of the other leg of each element comprising a free edge lip and the said offset lip of the leg of one element lapping the free edge lip of the leg of the other mating element to form a substantially closed edge joint, and fastening means securing said elements against said adjacent rails and to said panel.

7. A display assembly as claimed in claim 6 wherein said fastening means comprises two interlocking members, one attached to one element and the second attached to the other and each located at the intersection of the elevated portions of the leg portions of the element to which it is attached.

8. A display assembly as claimed in claim 6 wherein said inner peripheral flange portions comprises a webbing between said leg portions of each element and wherein the webbings of said elements are apertured to receive fastening means comprising a screw and nut.

9. A display assembly as claimed in claim 8 wherein the said webbing of each element includes an edge lip and wherein said lip and the elevated portions of each element project in opposite directions from the plane of said webbing.

10. In a display assembly including a panel having a pair of intersecting peripheral edges; a panel framing structure comprising a pair of side rails disposed respectively along each of said peripheral edges, said rails being substantially tubular in shape and having an open elongated seam, each of said rails receiving one of said peripheral edges through said open seam, and a corner construction for interconnecting adjacent ends of said rails, said corner construction comprising complementary substantially similar mating elements having elevated clamping portions generally conforming to the contour of said rails straddling and embracing said adjacent rail ends on opposite facial sides of said panel, each of said elements having a pair of outer peripheral edge portions generally paralleling said intersecting peripheral edges of said panel and one of such peripheral edge portions of each element comprising an offset lip which laps the other outer peripheral edge portion of the other element to form a lap joint therewith, the said lap joints provided by said outer peripheral edge portions forming a substantially closed peripheral seam between said elements, each of said elements also having inner peripheral flange portions in substantial abutment with a face of said panel and there being fastening means connected with each element at the elevated portions thereof, the said fastening means being connected to hold said elements in assembled relation to said rails and panel.

11. A display assembly as claimed in claim 10 wherein the outer ends of said fastening means are connected with said elevated portions of the elements and the said outer ends are substantially within the contour of said elevated portions.

12. In a display assembly including a panel having a pair of intersecting peripheral edges; a panel framing structure comprising a pair of side rails disposed respectively along each of said peripheral edges, said rails being substantially tubular in shape and having an open elongated seam, each of said rails receiving one of said peripheral edges through said open seam and having a pair of elongated flanges formed integrally substantially abutting said panel on opposite facial sides thereof, and a corner construction interconnecting adjacent ends of said side rails, said corner construction comprising complementary substantially similar mating elements having elevated clamping portions generally conforming to the contour of said rails, straddling and embracing said adjacent rail ends on the said opposite facial sides of said panel, each of said elements having a pair of outer peripheral edge portions generally paralleling said intersecting peripheral edges of the panel and one of such peripheral edge portions of each element comprising an offset lip which laps the other outer peripheral edge portion of the other element to form a lap joint therewith, the said lap joints provided by said outer peripheral edge portions forming a substantially closed peripheral seam between said elements, each of said elements also having an inner peripheral portion providing a webbing between the elevated portions thereof and said webbing being in substantial abutment with said elongated flanges of said rails and having a downturned lip the edge of which is in substantial abutment with a facial side of said panel and there being fastening means extending through apertures provided in the webbing of said elements and in said panel holding said elements in assembled clamping relationship to said rails.

13. Coupling means for securing together adjacent ends of adjacent generally tubular shaped side rails of a display assembly including a panel having said rails disposed along adjacent peripheral portions thereof, comprising substantially complementary mating elements having elevated clamping portions generally conforming to the contour of said side rails for straddling and embracing said adjacent rail ends on opposite facial sides of said panel, said elements having mutually engageable outer peripheral edge portions adapted to be brought into lapping relationship to provide a substantially closed edge joint between said elements, and having inner lip portions for seating against the panel and there being apertures in said elements for receiving fastening means for securing said elements against said adjacent rails and to said panel.

14. Coupling means for securing together adjacent ends of adjacent generally tubular shaped side rails of a display assembly including a panel having said rails disposed along adjacent peripheral portions thereof, comprising substantially complementary mating elements having elevated clamping portions generally conforming to the contour of said side rails for straddling and embracing said adjacent rail ends on opposite facial sides of said panel, said elements having mutually engageable outer peripheral edge portions adapted to be brought into lapping relationship to provide a substantially closed edge joint between said elements, and releasable fastening means carried by said coupling for securing said elements against said rails, one part thereof being interlocked with one of said mating elements at its inner side, another part thereof being interlocked with the other of said mating elements at the inner side of the latter and there being means for interlocking said parts together.

15. Coupling means for securing together adjacent ends of adjacent generally tubular shaped side rails of a display assembly including a panel having said rails disposed along adjacent peripheral portions thereof, comprising substantially complementary mating elements having elevated clamping portions generally conforming to the contour of said side rails for straddling and embracing said adjacent rail ends on opposite facial sides of said panel, said elements having mutually engageable outer peripheral edge portions adapted to be brought into lapping relationship to provide a substantially closed edge joint between said elements, and bipartite releasable fastening means carried by said coupling for securing said elements against said rails, one part comprising a threaded socket interlocked with one of said mating elements at its inner side and the other comprising a member having a threaded shank portion threadably engageable in said socket and extending through an aperture in said other mating element and having a head portion seatable against the outer face of said other element.

16. Coupling means for securing together adjacent ends of adjacent generally tubular shaped side rails of a display assembly including a panel having said rails disposed along adjacent peripheral portions thereof, comprising substantially complementary mating elements having elevated clamping portions generally conforming to the contour of said side rails for straddling and embracing said adjacent rail ends on opposite facial sides of said panel, said elements having mutually engageable outer peripheral edge portions adapted to be brought into lapping relationship to provide a substantially closed edge joint between said elements, and releasable snap-type fastening means carried by said coupling for securing said elements against said rails, said fastening means comprising interengageable members one rigidly secured to one of said mating elements at the inner side of its elevated portion and the other rigidly secured to the other of said mating elements at the inner side of its elevated portion.

17. Coupling means for securing together adjacent ends of adjacent generally tubular shaped side rails of a display assembly including a panel having said rails disposed along adjacent peripheral portions thereof, comprising substantially complementary mating elements having elevated clamping portions generally conforming to the contour of said side rails for straddling and embracing said adjacent rail ends on opposite facial sides of said panel, said elements having mutually engageable outer peripheral edge portions adapted to be brought into lapping relationship to provide a substantially closed edge joint between said elements, and releasable fastening means carried by said coupling for securing said elements against said rails, said fastening means comprising an externally threaded member detachably interlocked with the elevated portion of one of said mating elements and an internally threaded socket member secured to the elevated portion of the other of said mating elements and adapted to receive and threadedly interengage with said threaded member.

18. Coupling means for securing together the adjacent ends of adjacent generally tubular shaped side rails of a display assembly including a panel having said rails disposed along two intersecting peripheral edges of a corner thereof, comprising substantially complementary interchangeable mating elements of sheet-like material, adapted to straddle the adjacent side rails on opposite facial sides of said panel, each of said elements having intersecting leg portions disposed to each other at an angle corresponding to the included angle between said adjacent rails and each leg portion of said elements having an elevated portion adapted to nest with one of said rails, an inner peripheral flange portion for positioning in adjacency to a face of said panel and an outer peripheral edge portion, the said outer peripheral edge portion of one leg of each element comprising an offset lip and the outer peripheral edge portion of the other leg of each element comprising a free edge lip and the said offset lip of the leg of one element being adapted to lap the free edge lip of the leg of the other mating element to form a substantially closed edge joint.

19. Coupling means for securing together the adjacent ends of adjacent generally tubular shaped side rails of a display assembly including a panel having said rails disposed along two intersecting peripheral edges of a corner thereof, comprising substantially complementary interchangeable mating elements of sheet-like material, adapted to straddle the adjacent side rails on opposite facial sides of said panel, each of said elements having intersecting leg portions disposed to each other at an angle corresponding to the included angle between said adjacent rails and each leg portion of said elements having an elevated portion adapted to nest with one of said rails, an inner peripheral flange portion for positioning in adjacency to a face of said panel and an outer peripheral edge portion, the said outer peripheral edge portion of one leg of each element comprising an offset lip and the outer peripheral edge portion of the other leg of each element comprising a free edge lip and the said offset lip of the leg of one element being adapted to lap the free edge lip of the leg of the other mating element to form a substantially closed edge joint, and fastening means for securing said elements against said adjacent rails, said fastening means comprising two interlocking members, one attached to one element and the second attached to the other and each located at the intersection of the elevated portions of the leg portions of the element to which it is attached.

20. Coupling means for securing together the adjacent ends of adjacent generally tubular shaped side rails of a display assembly including a panel having said rails disposed along two intersecting peripheral edges of a corner thereof, comprising substantially complementary interchangeable mating elements of sheet-like material, adapted to straddle the adjacent side rails on opposite facial sides of said panel, each of said elements having intersecting leg portions disposed to each other at an angle corresponding to the included angle between said adjacent rails and each leg portion of said elements having an elevated portion adapted to nest with one of said rails, an inner peripheral flange portion for positioning in adjacency to a face of said panel and an outer peripheral edge portion, the said outer peripheral edge portion of one leg of each element comprising an offset lip and the outer peripheral edge portion of the other leg of each element comprising a free edge lip and the said offset lip of the leg of one element being adapted to lap the free edge lip of the leg of the other mating element to form a substantially closed edge joint, and said inner peripheral flange portions comprising a webbing between said leg portions of each element and said webbings being apertured to receive fastening means.

21. Coupling means for securing together the adjacent ends of adjacent generally tubular shaped side rails of a display assembly including a panel having said rails disposed along two intersecting peripheral edges of a corner thereof, comprising substantially complementary interchangeable mating elements of sheet-like material, adapted to straddle the adjacent side rails on opposite facial sides of said panel, each of said elements having intersecting leg portions disposed to each other at an angle corresponding to the included angle between said adjacent rails and each leg portion of said elements having an elevated portion adapted to nest with one of said rails, an inner peripheral flange portion for positioning in adjacency to a face of said panel and an outer peripheral edge portion, the said outer peripheral edge portion of one leg of each element comprising an offset lip and the outer peripheral edge portion of the other leg of each element comprising a free edge lip and the said offset lip of the leg of one element being adapted to lap the free edge lip of the leg of the other mating element to form a substantially closed edge joint, and said inner peripheral flange portions comprising a webbing between said leg portions of each element, said webbing including an edge lip and said webbing being apertured to receive a fastening means and said lip and the elevated portion of each element projecting in opposite directions from the plane of the webbing.

22. For a display assembly including a panel having adjacent side rails of generally tubular shape disposed along peripheral portions thereof; coupling means for securing together adjacent ends of said rails comprising mating elements of sheet-like material having elevated clamping portions for straddling and embracing said adjacent rail ends on opposite facial sides of said panel, said elements having mutually engageable outer peripheral edge portions adapted to be brought into lapping relationship to provide a substantially closed edge joint between said elements, certain of said peripheral edge portions being offset from said elevated portions, and fastening means for said coupling means comprising an externally threaded member detachably interlocked with the elevated portion of one of said mating elements and an internally threaded socket member secured to the elevated portion of the other of said mating elements and threadedly interengageable with said externally threaded member.

23. For a display assembly including a panel having adjacent side rails of generally tubular shape disposed along peripheral portions thereof; coupling means for securing together adjacent ends of said rails comprising mating elements of sheet-like material having elevated clamping portions for straddling and embracing said adjacent rail ends on opposite facial sides of said panel, said elements having mutually engageable outer peripheral edge portions adapted to be brought into lapping relationship to provide a substantially closed edge joint between said elements, certain of said peripheral edge portions being offset from said elevated portions, and fastening means comprising a screw member having a head and a threaded shank and a neck of reduced size between said head and threaded shank, and an internally threaded socket member for receiving said threaded screw shank of said screw member, one of said mating elements having its elevated portion provided with an apertured seat formed as a single thread of the same pitch as that of said threaded shank of said screw member, and adapted to receive the neck portion of said screw member whereby to prevent loss of said screw member from said element and the other of said mating elements having its elevated portion provided with an apertured seat to which said socket member is rigidly secured.

24. Coupling means for securing together adjacent ends of adjacent channel-like side rails of a display assembly including a panel having said rails disposed along adjacent peripheral portions thereof, comprising complementary mating elements of substantially similar shape having elevated portions defining legs for straddling and embracing said adjacent rail ends on opposite facial sides of said panel, said elements having mutually engageable outer peripheral edge portions on said legs adapted to be brought into lapping relationship to provide a substantially closed edge joint between said elements, the said outer peripheral edge portion of each of said elements comprising a longitudinally extending edge lip extending along the said outer peripheral edge portion thereof from adjacent one outer end thereof to a point of meeting with another longitudinally extending edge lip thereof transversely offset from said first mentioned lip and extending along said outer peripheral edge portion from the other outer end thereof, the said first mentioned edge lip of each element being adapted to engage the second mentioned edge lip of its mating element in a lap joint.

25. In a display assembly including a panel having a pair of intersecting peripheral edges, a panel framing structure comprising a pair of side rails of channel-like character disposed along and embracing said peripheral edges and coupling means for securing together adjacent ends of said side rails, said coupling means comprising opposite elements of substantially generally similar shape straddling said adjacent rail ends on opposite facial sides of said panel, each of said elements having intersecting leg portions disposed to each other at an angle substantially corresponding to the included angle between said adjacent rails and mating with corresponding leg portions of the opposite element and each of said leg portions including an elevated portion embracing the contour of its associated rail end and inner and outer peripheral edge portions at the base thereof, the said outer peripheral portion of a leg portion of one of said mating leg portions of the elements at each rail being outwardly offset from its adjacent elevated portion and lapping the outer peripheral portion of the mating leg portion of the opposite element to form substantially closed edge joints contiguous the mating leg portions of said elements and the inner peripheral edge portions of the mating legs substantially abutting said facial sides of said panel.

References Cited in the file of this patent

UNITED STATES PATENTS

| | | |
|---|---|---|
| 394,479 | Evans et al. | Dec. 11, 1888 |
| 420,681 | Gilbert | Feb. 4, 1890 |
| 1,321,974 | Bourque | Nov. 18, 1919 |
| 1,601,819 | Ganster | Oct. 5, 1926 |
| 1,625,510 | Tredwell | Apr. 19, 1927 |
| 1,845,334 | Woller | Feb. 16, 1932 |
| 1,857,141 | Corley | May 10, 1932 |
| 1,857,423 | Zadek | May 10, 1932 |
| 2,048,359 | Snell | July 21, 1936 |
| 2,152,374 | Burr | Mar. 28, 1939 |
| 2,210,048 | Swanson | Aug. 6, 1940 |
| 2,442,967 | Barasch et al. | June 8, 1948 |